(12) United States Patent
Duda (10) Patent No.: US 10,216,853 B2
(45) Date of Patent: Feb. 26, 2019

(54) METHOD AND SYSTEM FOR IMPLEMENTING A VXLAN CONTROL PLANE

(71) Applicant: Arista Networks, Inc., Santa Clara, CA (US)

(72) Inventor: Kenneth James Duda, Santa Clara, CA (US)

(73) Assignee: Arista Networks, Inc., Santa Clara, CA (US)

(*) Notice: Subject to any disclaimer, the term of this patent is extended or adjusted under 35 U.S.C. 154(b) by 329 days.

(21) Appl. No.: 14/317,713

(22) Filed: Jun. 27, 2014

(65) Prior Publication Data

US 2015/0379150 A1 Dec. 31, 2015

(51) Int. Cl.
*G06F 17/30* (2006.01)
*H04L 12/46* (2006.01)

(52) U.S. Cl.
CPC .. *G06F 17/30876* (2013.01); *G06F 17/30864* (2013.01); *H04L 12/4675* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,374,294 | B1* | 6/2016 | Pani | H04L 12/18 |
| 2013/0329605 | A1* | 12/2013 | Nakil | H04L 41/0668 |
| | | | | 370/255 |
| 2015/0006953 | A1* | 1/2015 | Holbrook | G06F 11/0724 |
| | | | | 714/13 |
| 2015/0009992 | A1* | 1/2015 | Zhang | H04L 49/354 |
| | | | | 370/392 |
| 2015/0058470 | A1* | 2/2015 | Duda | H04L 12/4633 |
| | | | | 709/224 |
| 2015/0100704 | A1* | 4/2015 | Davie | H04L 45/16 |
| | | | | 709/238 |
| 2015/0124817 | A1* | 5/2015 | Merchant | H04L 45/74 |
| | | | | 370/392 |

OTHER PUBLICATIONS

Extended European Search Report in corresponding European Application No. 15174078.4 dated Nov. 11, 2015 (12 pages).

(Continued)

*Primary Examiner* — Shyue Jiunn Hwa
(74) *Attorney, Agent, or Firm* — Chamberlain, Hrdlicka, White, Williams & Aughtry (57) ABSTRACT

A method for distributing VXLAN information that includes receiving, from a first leaf network device and by a first intermediate network device, first VXLAN information associated with a first computing device. The first leaf network device is connected to the first computing device and includes a first database server. The first intermediate network device includes a first database client and a second database server. The method also includes storing the first VXLAN information in a first database entry on the first intermediate network device; sending, by a second database server, a first copy of the first database entry to a higher-tier network device, and sending, by the first database client, a second copy of the first database entry to a third database server. The third database server is executing on a second leaf network device.

17 Claims, 6 Drawing Sheets

(56) References Cited

OTHER PUBLICATIONS

Edouard Thuleau: "L2population blueprint", OpenStack Wiki, Apr. 11, 2014 (Apr. 11, 2014), XP055226556 (11 pages).
Robert Kukura et al: "Modular Layer 2 In OpenStack Neutron", Nov. 10, 2013 (Nov. 10, 2013), XP055226648 (31 pages).
Booxter: "neutron/plugin.py at b43307b768a0fa851194ada5b73baf541934ea19 . openstack/neutron .", GitHub, Jun. 24, 2014 (Jun. 24, 2014), XP055226775 (10 pages).
Booxter: "neutron/rpc.py at b43307b768a0fa851194ada5b73baf541934ea19 . openstack/neutron", GitHub, Jun. 24, 2014 (Jun. 24, 2014), XP055226833 (4 pages).
Booxter: "neutron/mech_driver.py at b43307b768a0fa851194ada5b73baf541934ea19 . openstack/neutron", GitHub, Jun. 17, 2014 (Jun. 17, 2014), XP055226845 (4 pages).
Romil Gupta: "Messaging in Openstack using RabbitMQ", iLeamStack, Apr. 24, 2013 (Apr. 24, 2013), XP055226554 (5 pages).
"OpenStack Networking Administration Guide", Feb. 4, 2013 (Feb. 4, 2013), XP055226586 (97 pages).

* cited by examiner

METHOD AND SYSTEM FOR IMPLEMENTING A VXLAN CONTROL PLANE

BACKGROUND

Computing devices often send data to and receive data from other computing devices via a network. This is commonly accomplished, in part, by creating a layer 3 (L3) internet protocol (IP) packet that includes, at least, the data to be communicated and a source and destination IP address. The packet is then encapsulated in a layer 2 (L2) media access control (MAC) frame that includes, at least, the packet and a source and destination MAC address. Information included in the MAC frame (e.g., source IP address, destination IP address, source MAC address, destination MAC address) allows network devices that exist between the sending and receiving computing devices to determine the intended destination of the MAC frame in order to transmit the MAC frame to the appropriate next-hop on the path to the destination computing device of the MAC frame.

In a virtual extensible local area network (VXLAN) environment, MAC frames are sent from and received by computing devices, in part, via VXLAN tunnel end points (VTEPs) to which a computing device is operatively connected. To send a MAC frame on behalf of a sending computing device, a sending VTEP must know the IP address of a receiving VTEP that is operatively connected to the computing device identified as the destination of the MAC frame via a destination MAC address (i.e., a MAC-to-VTEP mapping). In order to transmit a MAC frame to the receiving VTEP (which will, in turn, transmit the MAC frame to the appropriate destination computing device), a sending VTEP encapsulates the MAC frame in a VXLAN frame in which the IP address of the remote VTEP becomes the destination IP address of the VXLAN frame. This VTEP IP address is used (along with other information in the VXLAN frame) to transport the VXLAN frame through a network until the VXLAN frame reaches the receiving VTEP, which extracts the original MAC frame from the VXLAN frame and transmits the MAC frame to the computing device identified by the destination MAC address of the original MAC frame.

According to the VXLAN Draft Specification, when the MAC-to-VTEP mapping is not known by a VTEP for a destination computing device, the MAC frame is encapsulated in IP multicast and flooded throughout the VXLAN domain, improving the likelihood that a frame arrives at the VTEP that is operatively connected to the destination computing device, while incurring the cost of delivery to potentially many other VTEPs

SUMMARY

In general, in one aspect, the invention relates to a method for distributing virtual extensible local area network (VXLAN) information that includes receiving, from a first leaf network device and by a first intermediate network device, first VXLAN information associated with a first computing device. The first leaf network device is operatively connected to the first computing device and the first leaf network device includes a first database server. The first intermediate network device includes a first database client and a second database server. The method also includes storing the first VXLAN information in a first database entry in a first database on the first intermediate network device, sending, by a second database server, a first copy of the first database entry to a higher-tier network device, and sending, by the first database client, a second copy of the first database entry to a third database server. The third database server is executing on a second leaf network device. The first intermediate network device is one selected from a group consisting of a router and a switch. The first leaf network device is a first switch and the second leaf network device is a second switch.

In general, in one aspect, the invention relates to a system that includes a first leaf network device. The first leaf network device includes a first virtual extensible local area network (VXLAN) tunnel end-point (VTEP) and is operatively connected to a first computing device. The system also includes a second leaf network device that includes a first database server and a second VTEP. Additionally, the system includes an intermediate network device operatively connected to the first leaf network device and to the second leaf network device. The intermediate network device includes a first database client, a second database server, and a database. The intermediate network device is configured to receive, from the first leaf network device, first VXLAN information associated with the first computing device, store the first VXLAN information in a first database entry in the database; send, by the second database server, a first copy of the first database entry to a higher-tier network device and send, by the first database client, a second copy of the first database entry to the first database server of the second leaf network device.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to the distribution of virtual extensible local area network (VX-LAN) information between network devices and/or VXLAN tunnel endpoints (VTEPs) using a VXLAN Control Plane (VCP) hierarchy. More specifically, the invention relates to the use of a database management protocol (e.g., the Open vSwitch Database (OVSDB) protocol) to allow database clients to receive VXLAN information from database servers, as well as to distribute the VXLAN information to one or more other database servers. In one or more embodiments of the invention, leaf network devices that provide network access to computing devices are at the bottom tier of a VCP hierarchy and include database server functionality. The top of a VCP hierarchy may be a root database client executing on a root network device. Intermediate tiers of the VCP hierarchy may exist between the leaf tier and the root database client and include intermediate network devices on which both a database client and a database server execute. In one or more embodiments of the invention, intermediate network devices and/or the root network device may be network virtualization controllers. VXLAN information may include, at least, the mapping between the MAC address of a computing device and the IP address of the VTEP to which the computing device is attached (MAC-to-VTEP mapping). In one or more embodiments of the invention, database clients and database servers are arranged in a hierarchy within a network. The hierarchy may ensure that VTEPs participating in a VXLAN are informed of MAC-to-VTEP mappings for other VTEPs in the network. In such embodiments, the need to use IP multicast to distribute MAC-to-VTEP mappings via frames for which the destination MAC-to-VTEP mapping is not known may be reduced. In one or more embodiments of the invention, the hierarchical structure may reduce the chance that the failure of any one network virtualization controller will adversely affect VXLAN and/or physical network performance.

In one or more embodiments of the invention, implementations of a VXLAN control plane use, at least in part, the VXLAN protocol. One version of the VXLAN protocol is defined in the document entitled "VXLAN: A Framework for Overlaying Virtualized Layer 2 Networks over Layer 3 Networks" version 08 dated Feb. 3, 2014. The VXLAN protocol is hereby incorporated by reference in its entirety. The invention is not limited to a particular version of VXLAN.

In one or more embodiments of the invention, implementations of a VXLAN control plane use, at least in part, the OVSDB management protocol. One version of the OVSDB protocol is defined in the Internet Engineering Task Force (IETF) Request for Comment (RFC) 7047 document entitled "The Open vSwitch Database Management Protocol" dated December 2013. The OVSDB management protocol is hereby incorporated by reference in its entirety. The invention is not limited to a particular version of the OVSDB management protocol.

In one or more embodiments of the invention, implementations of a VXLAN control plane use, at least in part, an Open vSwitch database schema. One version of an Open vSwitch schema is defined in a document entitled "Open vSwitch Manual" dated Oct. 4, 2013. The Open vSwitch Manual is hereby incorporated by reference in its entirety. The invention is not limited to a particular version of the Open vSwitch Manual.

Figure 1:
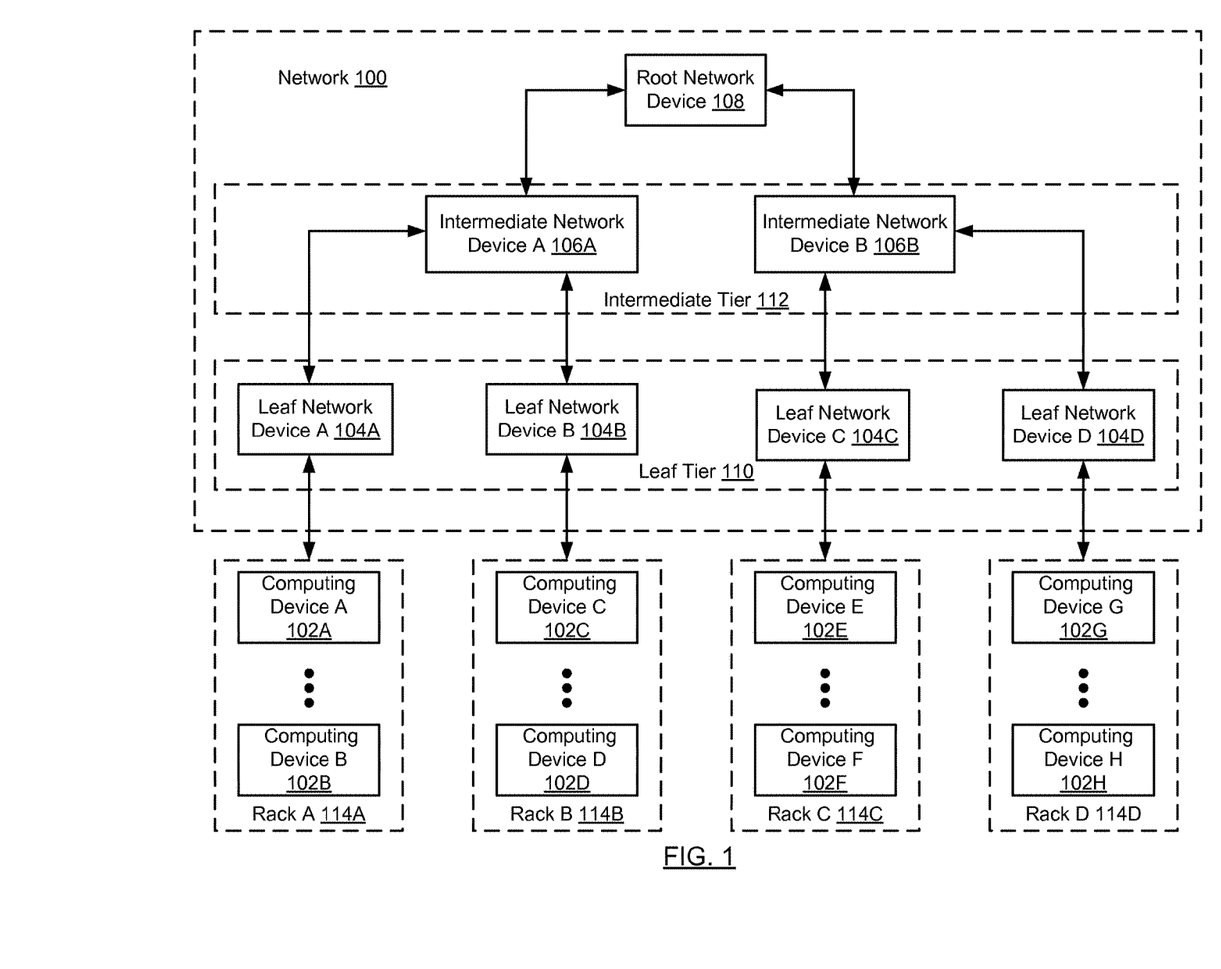
FIG. 1 shows a network in accordance with one or more embodiments of the invention.

FIG. 1 shows a network in accordance with one or more embodiments of the invention. In one or more embodiments of the invention, the system includes a network (100). A network may include leaf network devices (104A-104D) in a leaf tier (110), intermediate network devices (108A-108B) in an intermediate tier (112), and a root network device (106A). Leaf network devices may be operatively connected to computing devices (102A-102GH) located in racks (114A-114D). Each of these components is described below.

In one or more embodiments of the invention, a network (100) is a collection of one or more network devices that facilitate network connectivity for one or more computing devices. In one or more embodiments of the invention, the network (100) may be all or a portion of a computer network. A computer network may include a datacenter network, a wide area network, a local area network, a wireless network, a cellular phone network, or any other suitable network that facilitates the exchange of information from one part of the network to another. In one or more embodiments, the network (100) is coupled with or overlaps with the Internet. In one or more embodiments of the invention, the network (100) is arranged and connected as a hierarchy, including a leaf tier (110) of leaf network devices (104A-104D), one or more intermediate tiers (e.g., intermediate tier 112) including intermediate network devices (106A-106B), and a root network device (106). In such embodiments of the invention, the root network device is operatively connected to one or more lower-tier intermediate network devices which are, in turn, operatively connected to one or more lower-tier leaf network devices.

In one or more embodiments of the invention, leaf network devices (104A-104D) of a leaf network tier (110) are switches and/or routers. The leaf network devices may provide connectivity between one or more computing devices and the rest of a network (100). A switch is a physical device that includes persistent storage, memory (e.g., Random Access Memory), one or more processors, and two or more physical ports (i.e., interfaces). Each port may or may not be connected to another device on a network (e.g., a server, a switch, a router, a network virtualization controller, etc.). A switch may be configured to receive packets (encapsulated in a MAC frame) via the ports and determine whether to (i) drop the packet, (ii) process the packet in accordance with one or more embodiments of the invention (e.g., encapsulate the MAC frame as a VXLAN frame and prepare to send the VXLAN frame to a remote VTEP via the network), and/or (iii) send the packet, based on the processing, out another port on the switch.

How the switch makes the determination of whether to drop the packet or send the packet to another device on the network depends, in part, on whether the switch is a layer-2 (L2) switch or a layer-3 (L3) switch (also referred to as a multi-layer switch), which may perform at least some functions of a router. If the switch is operating as a L2 switch, the switch uses the destination Media Access Control (MAC) address along with a forwarding table to determine out of which port to send the packet. If the switch is operating as a L3 switch, the switch uses the destination IP address along with a routing table to determine out of which port to send the packet. If the switch is a multi-layer switch, the multi-layer switch includes functionality to process packets using both MAC addresses and IP addresses.

To send packets between networks, a router, or switch acting as a router may be used. A router is a network device that is operatively connected to two or more computer networks and includes functionality to communicate packets between the networks. A router, similar to the L3 switch described above, uses destination IP addresses and a routing table to determine a route to the destination computing device. The routing table may include the MAC address of the next-hop device along that route, which is written as the destination MAC address of the MAC frame or VXLAN frame in which the packet is encapsulated. The router may then send the packet out of an interface operatively connected to the next-hop device.

In one or more embodiments of the invention, the leaf network devices function as top-of-rack (ToR) switches that provide network connectivity to one or more computing devices (102A-102H) located in racks (114A-114D) of computing devices (102A-102H).

In one or more embodiments of the invention, the leaf network devices (104A-104D) include functionality to participate in a virtual extensible local area network (VXLAN). In such embodiments of the invention, each of the leaf network devices includes a VXLAN tunnel endpoint (VTEP) (not shown). In one or more embodiments of the invention, each VTEP includes functionality to generate VXLAN frames and process received VXLAN frames in accordance with the VXLAN protocol. Each VTEP may be implemented as a combination of software and storage (volatile and/or persistent storage). Alternatively, each VTEP may be implemented as a combination of hardware and storage (volatile and/or persistent storage). In another alternative, each VTEP may be implemented as a combination of hardware and software.

In one or more embodiments of the invention, leaf network devices (104A-104D) that include a VTEP also include a database (not shown) and execute as a database server (not shown) relative to a database client executing on an intermediate network device (106A-106B) to which the leaf network device is operatively connected. For example, a leaf network device with a VTEP may include an Open vSwitch Database (OVSDB) server. A database server communicates with a database client via a database management protocol (e.g., the OVSDB management protocol). In one or more embodiments of the invention, the database server of the leaf network device executes as a database server relative to a database client operating on either a virtual machine or a physical computing device.

In one or more embodiments of the invention, a leaf network device (104A-104D) that includes a VTEP and a database also includes functionality to store VXLAN information (not shown) in the database. A database, as used herein, is any information repository that is capable of storing VXLAN information and of being managed, at least in part, by a database management protocol. A database, as used herein, may be a collection of one or more smaller databases. For example, the "database" may consist of one or more databases for storing locally learned VXLAN information as well as one or more databases for storing remotely learned VXLAN information. VXLAN information may include MAC-to-VTEP mappings. The MAC-to-VTEP mappings may be locally learned (e.g., from directly connected computing devices and/or VTEPs), learned from VXLAN operations (e.g., learned from the inner source MAC and outer source IP addresses of VXLAN-encapsulated frames received from remote VTEPs), learned from a network virtualization controller, learned via static configuration, and/or learned from a database client (e.g., an OVSDB client). In embodiments of the invention in which the leaf network device includes a database server, the VXLAN information is stored in the database as a database entry. The database client and database server relationship is described further in the description of FIG. 2, below.

In one or more embodiments of the invention, intermediate network devices (106A-106B) of an intermediate tier (112) are switches, routers, and/or network virtualization controllers. A network virtualization controller may be software that includes functionality to, at least in part, manage a VXLAN environment. VTEPs may send information to or receive information from a network virtualization controller. VTEPs may register with a network virtualization controller in order to receive VXLAN information. Network virtualization controllers may distribute received VXLAN information to other network devices in the network. A network virtualization controller may execute on a traditional network device, (e.g., a switch and/or a router), or on a physical or virtual machine operatively connected to the network (100). As used in this document, an intermediate network device (106A-106B) in an intermediate tier (112) is any hardware, software, or combination thereof capable of receiving, processing, and sending MAC frames, VXLAN frames, database management protocol commands, and/or any other information necessary to function in accordance with one or more embodiments of the invention. For example, an intermediate network device may be a network device (e.g., a multi-layer switch) or a physical or virtual machine on which a network virtualization controller executes.

In one or more embodiments of the invention, the intermediate network devices (106A-106B) provide connectivity between the various leaf network devices (104A-104D) and/or connectivity between the leaf network devices (104A-104D) and network devices above the intermediate network devices in the network (100) hierarchy.

In one or more embodiments of the invention, the intermediate network devices (106A-106B) include a database client (not shown). A database client is software designed to interact with, receive information from, and/or send information to a database server (described above). A database client may use a database management protocol (e.g., the OVSDB management protocol) to facilitate communication with a database server.

In one or more embodiments of the invention, the intermediate network devices (106a-106B) also include a database server (not shown). The database server of an intermediate network device may function as the database server for a database client that is above the intermediate network device in the network (100) hierarchy. Database client and database server relationship is described further in the description of FIG. 2, below.

In one or more embodiments of the invention, intermediate network devices (106A-106B) include functionality to communicate (i.e., receive and/or send) VXLAN information using more than one management protocol. For example, an intermediate network device may, as a database client, communicate (regarding VXLAN information) with a database server of a leaf network device (104A-104B) using a database management protocol, and, as a database server, communicate with a root database client of a root network device (108) (or any higher-tier database client) using the same database management protocol. The same intermediate network device may include functionality to communicate with other leaf network devices and/or root (or higher-tier) network devices using different management protocol to communicate VXLAN information which, for example, allows for more efficient communication as compared to the database management protocol.

In one or more embodiments of the invention, the network (100) includes a root network device (108). A root network device may be a traditional network device, such as a switch and/or a router. In such embodiments of the invention, the root network device may function as a gateway between devices in the network and devices beyond the network, such as those connected to other networks (e.g., the Internet). In one or more embodiments of the invention, the root network device is a physical or virtual machine operatively connected to the network that includes functionality to manage at least some aspects (e.g., VXLAN information distribution) of the network. In one or more embodiments of the invention, the root network device includes a network virtualization controller (not shown).

In one or more embodiments of the invention, connected to the leaf network devices are computing devices (102A-102H) located in racks (114A-114D). As used in this document, a rack is a collection of computing devices (102A-102H). For example, in FIG. 1, rack A (114A) includes one or more computing devices (e.g., 102A-102B). A rack may include functionality to provide the necessary space, cabling, power, cooling, etc. required by the computing devices of the rack. In one or more embodiments of the invention, a rack is a chassis for holding blade servers.

In one or more embodiments of the invention, a computing device (102A-102H) is a physical or virtual system capable of electronically processing instructions. A computing device may be a server, blade in a blade-server chassis, a desktop computer, a mobile device (e.g., laptop computer, smart phone, tablet computer, or other mobile device), a network attached storage (NAS) device, or any other type of computing device or devices that includes at least the minimum processing power, memory, input and output device(s), and network connectivity to perform, at least in part, one or more embodiments of the invention. In one or more embodiments of the invention, a computing device is a server acting as a virtual machine (VM) host (i.e., a physical server on which one or more VMs execute). In such embodiments of the invention, the computing device may include a VTEP and include functionality to provide to a leaf network device MAC-to-VTEP mappings (i.e., VXLAN information) that include the MAC address of a hosted VM associated with the VTEP IP address of the VM host.

Although the network of FIG. 1 shows four leaf network devices, two intermediate network devices, and one root network device arranged in a three-tier hierarchy, the quantity of each of these system components may vary based on the particular needs of a given implementation of a VXLAN control plane. For example, there may be more or less leaf network devices and more or less intermediate network devices. Furthermore, there may be more or less tiers in the hierarchy of the network. For example, while a leaf tier leaf network device generally connects to computing devices, and there is generally only one root node in the network, there may be more than one intermediate tier present in the network in order to meet the requirements of the network and/or VXLAN control plane.

The invention is not limited to the system configuration shown in FIG. 1.

Figure 2:
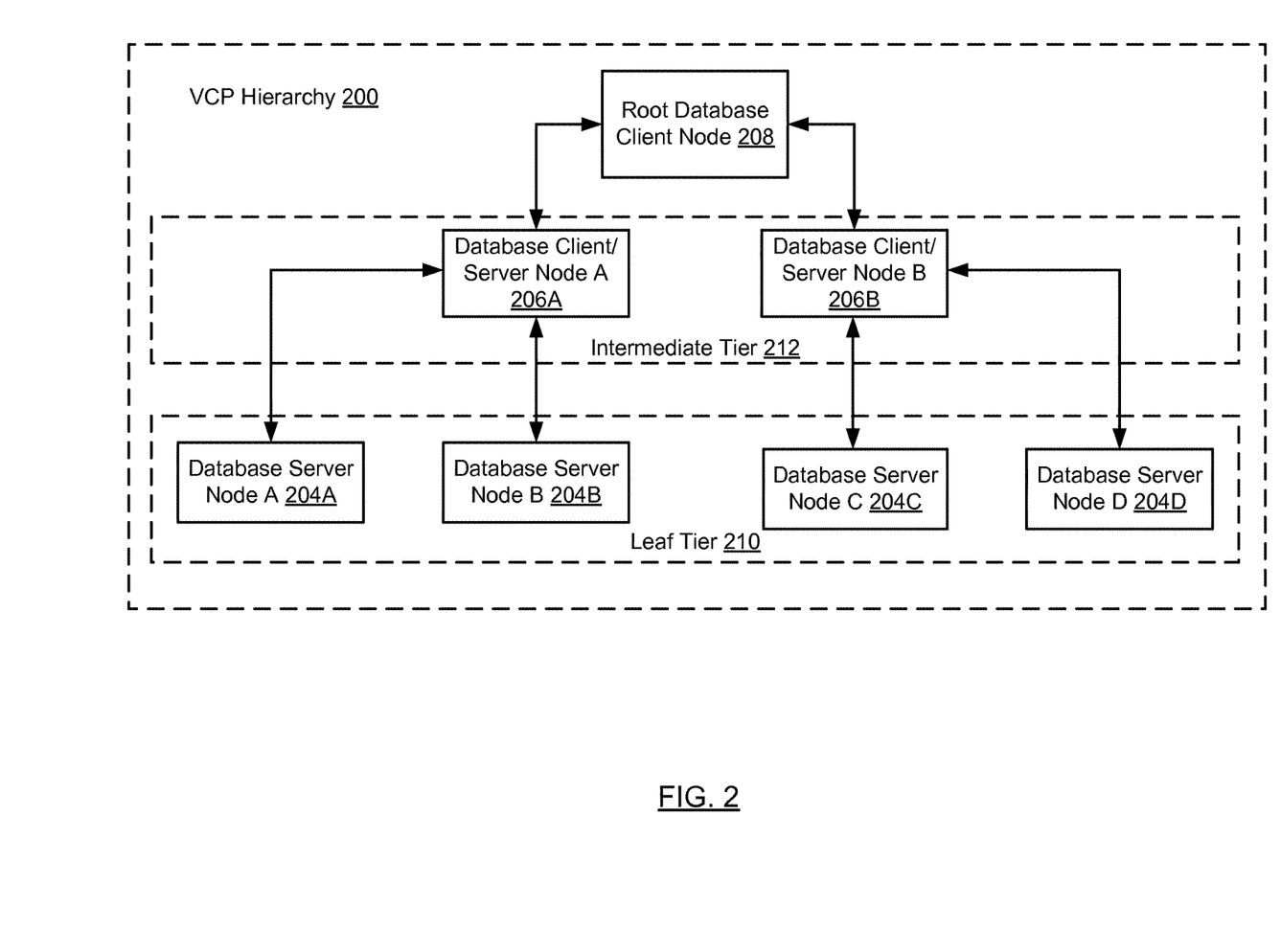
FIG. 2 shows a VXLAN Control Plane hierarchy in accordance with one or more embodiments of the invention.

FIG. 2 shows a VXLAN Control Plane (VCP) hierarchy in accordance with one or more embodiments of the invention. In one or more embodiments of the invention, the VCP hierarchy (200) includes a root database client node (208), an intermediate tier (212) that includes database client/server nodes (206A-206B), and a leaf tier (210) that includes database server nodes (204A-204D). Each of these components is described below.

In one or more embodiments of the invention, the VCP hierarchy (200) is a hierarchy of database servers and clients (e.g., OVSDB servers and OVSDB clients) that are executing on network devices in a network such as the network (100) discussed in the description of FIG. 1, above. In one or more embodiments of the invention, a VCP hierarchy may include only one root database client node (208) operatively connected to one or more database client/servers (206A-206B) of an intermediate tier (212). In one or more embodiments of the invention, the VCP hierarchy is further arranged such that all database server nodes (204A-204D) executing on leaf network devices (e.g., leaf network devices (104A-104D) of FIG. 1) in the leaf tier (210) are connected to at least one database client/server node (e.g., database client/server nodes (206A-206B)) executing on intermediate network devices (e.g., intermediate network devices (106A-106B) of FIG. 1). In one or more embodiments of the invention, the database client/servers (206A-206B) are operatively connected to one or more database servers that are lower in the VCP hierarchy (200) as well as to the root database client (208) that is higher in the VCP hierarchy (200). Though not shown in FIG. 2, there may be more than one intermediate tier in which database client/server nodes are executing. As used in this document, "higher" and "higher-tier" generally mean closer to root and "lower" and "lower-tier" generally mean closer to the leaf tier. In one or more embodiments of the invention, within the VCP hierarchy (200), database clients of higher-tiers communicate with database servers in lower-tiers using a database management protocol such as the OVSDB protocol.

In one or more embodiments of the invention, a database server node (204A-204D) includes functionality to receive, process, store (e.g., in a database), and/or send copies of database entries (not shown). A database server node may include a database for storing information as database entries, which may include VXLAN information such as MAC-to-VTEP mappings. In one or more embodiments of the invention, a database server node includes functionality to communicate with a database client using a database management protocol (e.g., the OVSDB management protocol). In one or more embodiments of the invention, a database server node executes on a leaf network device (e.g., leaf network devices 104A-104D of FIG. 1) which is operatively connected to one or more computing devices and also includes a VTEP. A VTEP of a leaf network device on which a database server node (204A-204C) is executing may use VXLAN information stored in database entries to perform VXLAN-related functionality such as MAC frame encapsulation.

In one or more embodiments of the invention, the database server node executes on a leaf network device (e.g., leaf network devices 104A-104D of FIG. 1) operatively connected to computing devices that do not include a VTEP. In such embodiments of the invention, the leaf network device includes functionality to determine the MAC address(es) of the attached computing devices, which are associated with the VTEP IP address of the leaf network device on which the database server is executing to create MAC-to-VTEP mapping(s) that are each stored in a database as a database entry.

In one or more embodiments of the invention, the database server nodes (204A-204D) are operatively connected to, at least, one or more VM hosts hosting one or more VMs and executing a VTEP. In such embodiments of the invention, the database sever nodes include functionality to receive VXLAN information from a VM host, including MAC-to-VTEP mappings for the VTEP IP address of the VM host, and store the information as one or more database entries.

In one or more embodiments of the invention, a root database client node (208) exists atop the VCP hierarchy (200). In one or more embodiments of the invention, there is only one root database client node in a VCP hierarchy. In one or more embodiments of the invention, the root database client node (208) is operatively connected to one or more database client/server nodes lower in the VCP hierarchy. In one or more embodiments of the invention, the root database client node is executing on a root network device (e.g., root network device (108) of FIG. 1) and includes functionality to interact with the database server aspect of the database client/server nodes in a lower intermediate tier (e.g., intermediate tier (212)) using a database management protocol (e.g., the OVSDB management protocol). In one or more embodiments of the invention, the root database client node does not include a database.

In one or more embodiments of the invention, the database client/server nodes (206A-206B) in the intermediate tier (212) of the VCP hierarchy (200) are executing on intermediate network devices (e.g., intermediate network devices (106A-106B) in the intermediate tier (112) of the network (100) of FIG. 1), which may be traditional network devices (e.g., switches and/or routers) or physical or virtual machines. In one or more embodiments of the invention, database client/server nodes execute in conjunction with a network virtualization controller (not shown) that is executing on the same intermediate network device.

In one or more embodiments of the invention, database client/server nodes (206A-206B) include both a database client and a database server. The database client aspect of the database client/server node may interact with database servers lower in the VCP hierarchy (e.g., the database server nodes (204A-204D) in the leaf tier (210) using a database management protocol (e.g. the OVSDB management protocol) to receive and/or distribute database entries that include VXLAN information. The database server aspect of the database client/server node may, using a database management protocol, interact with database clients higher in the VCP hierarchy, such as a root database client node or a database client/server node in another intermediate tier (not shown) that is higher in the VCP hierarchy (200). Acting as a database server, a database client/server node may include functionality to send database entries including VXLAN information to a database client higher in the VCP hierarchy.

Although the above description of FIG. 2 contemplates embodiments of the invention in which the VCP hierarchy exists on a network hierarchy such as that discussed above in the description of FIG. 1, in one or more embodiments of the invention, the VCP hierarchy may exist either wholly or partly on devices other than network devices in a network hierarchy. For example, there may be eight or more spine switches all "operatively connected" to dozens or hundreds of leaf switches on which a database server is executing, while one or more database clients may be executing in one or more VMs operatively connected to the network, with no database server or database client executing on network devices in the spine layer of the network.

The invention is not limited to the system configuration shown in FIG. 2

Figure 3:
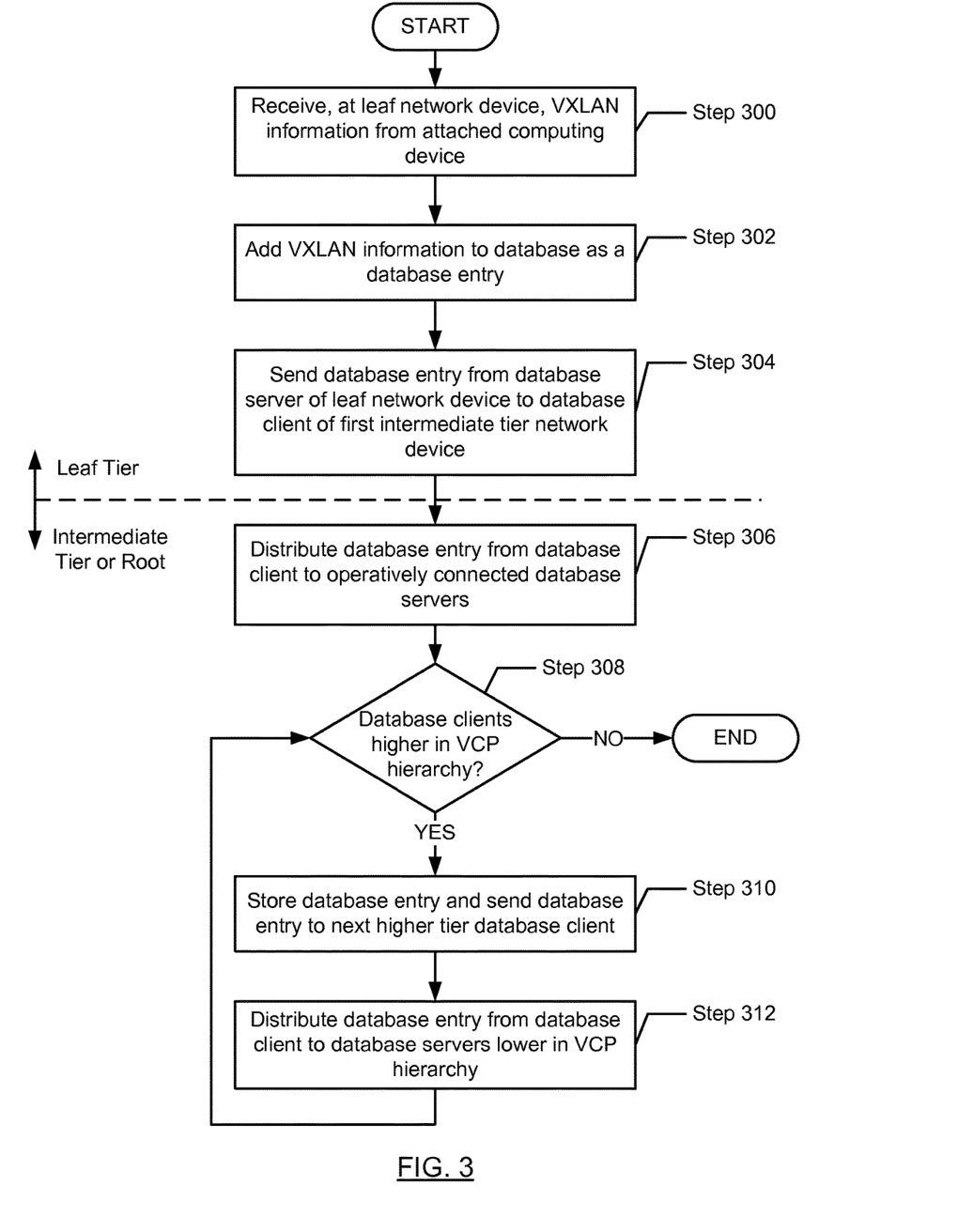
FIG. 3 shows method for distributing VXLAN information between network devices in accordance with one or more embodiments of the invention.
Figure 4:
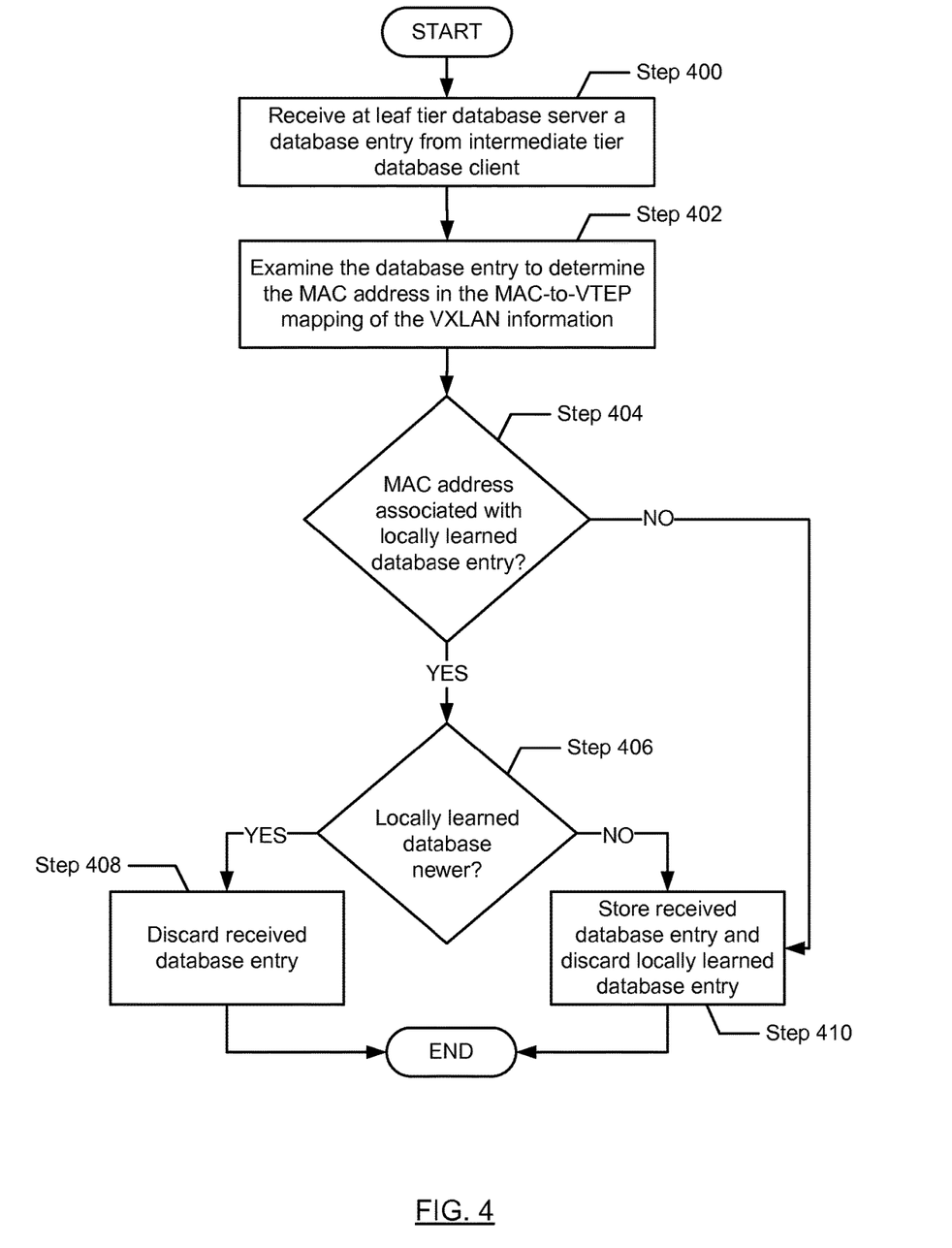
FIG. 4 shows a method for receiving VXLAN information at a database server in accordance with one or more embodiments of the invention.

FIGS. 3 and 4 show flowcharts in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel. In one embodiment of the invention, the steps shown in FIGS. 3 and 4 may be performed in parallel with any other steps shown in FIGS. 3 and 4 without departing from the invention.

Turning to FIG. 3, FIG. 3 shows the distribution of VXLAN information using a VCP hierarchy in accordance with one or more embodiments of the invention. In Step 300, a leaf network device receives VXLAN information from an attached computing device. In one or more embodiments of the invention, the VXLAN information received is a MAC-to-VTEP mapping between a MAC address of a VM and the VTEP IP address of the VM host. In one or more embodiments of the invention, the VXLAN information received is the MAC address of the attached computing device, which is associated with the VTEP IP address of the VTEP executing on the leaf network device to create a MAC-to-VTEP mapping. In such embodiments of the invention, the MAC address of the attached computing device may be learned via examination of a MAC frame received at the leaf network device from the attached computing device.

In Step 302, the VXLAN information is added to a database as a database entry. In one or more embodiments of the invention, the leaf network device includes a database and functions as a database server. The VXLAN information may be formatted in an appropriate manner to be stored as a database entry in the database of the leaf network device.

In Step 304, a copy of the database entry created from the VXLAN information and stored in the database of the leaf network device is sent by the database server of the leaf network device to a database client executing on an intermediate network device. In one or more embodiments of the invention, the database client of the intermediate network device communicates with the database server of the leaf network device using a database management protocol (e.g., the OVSDB management protocol). In one or more embodiments of the invention, the database server of the leaf network device is configured to send new database entries when they are received, learned, and/or created. In other embodiments of the invention, new database entries are sent periodically. In still other embodiments of the invention, the database client, using the database management protocol, requests new database entries from the database server periodically, aperiodically, and/or immediately upon changes to the database.

In one or more embodiments of the invention, the intermediate network device, in addition to including functionality of a database client to receive VXLAN information as a database entry from a database server, also includes functionality to receive VXLAN information via one or more different management protocols. In such embodiments, the intermediate network device also includes functionality to transform VXLAN information received using a different management protocol into a database entry in the database of the intermediate network device, thereby adding the information received using the different protocol into the pool of information available to be disseminated using the VCP hierarchy of database clients and database servers.

In Step 306, the database client of the intermediate network device distributes copies of the new database entry to other database servers (i.e., other than the database server from which the database entry was received) executing on other leaf network devices in the leaf tier that are operatively connected to the intermediate network device. For example, after receiving a new database entry from a database server of a leaf network device, the database client of the intermediate network device may be configured to distribute that database entry to the database servers executing on all other leaf network devices on which a VTEP is executing and to which the intermediate network device is operatively connected. In one or more embodiments of the invention, copies of database entries received from intermediate tier database clients at leaf tier database servers are stored in the database of the leaf network device. In one or more embodiments of the invention, copies of database entries that are received by leaf database servers from intermediate tier database clients are stored separately and/or distinctly from database entries that are learned by the leaf network device related to connected computing devices.

In Step 308, a determination is made as to whether there are database clients higher in the VCP hierarchy than the database client/server executing on the intermediate network device. If there are none, then the database client of the intermediate network device is actually a root database client node and the process ends. If, on the other hand, there is a database client higher in the VCP hierarchy, the process moves to Step 310.

In Step 310, the database client of the intermediate network device sends the database entry to the database server of the intermediate network device, which stores the database entry in a database of the intermediate network device and then sends a copy of the database entry to the database client higher in the VCP hierarchy to which the intermediate network device is operatively connected. In one or more embodiments of the invention, the database client of the next-higher-tier network device communicates with the database server of the intermediate network device using a database management protocol (e.g., the OVSDB management protocol). In one or more embodiments of the invention, the database server of the intermediate network device is configured to send copies of new database entries when they are received. In other embodiments of the invention, copies of the new database entries are sent periodically. In still other embodiments of the invention, the database client higher in the VCP hierarchy, using the database management protocol, requests copies of new database entries from the database server of the intermediate network device either periodically or aperiodically. In one or more embodiments of the invention, a copy of the database entry is sent from the database server of the intermediate network device to a root database client node atop the VCP hierarchy. In other embodiments of the invention, a copy of the database entry is sent from the database sever of the intermediate network device to a database client of another intermediate network device that exists in an intermediate tier that is higher in the VCP hierarchy.

In Step 312, the database client of the next higher-tier that received the database entry in Step 310, using a database management protocol, distributes the new database entry to other database servers executing on other intermediate network devices that are operatively connected to the next higher-tier database client. For example, after receiving a new database entry from a database server of an intermediate network device, the database client of the next higher-tier network device may be configured to distribute that database entry to the database server of all, or a portion, of the other intermediate network devices to which the next higher-tier database client is operatively connected. Those intermediate network devices may, in turn, be configured to, as a database client and using the database management protocol, send the database entry to database servers in the next lower-tier of the VCP hierarchy. This higher-tier to lower-tier distribution of the database entry may continue until the database entry reaches the database servers of leaf network devices on which a VTEP is executing and to which computing devices are operatively connected. Each database client/server of an intermediate network device in one of the intermediate tiers may store the database entry in its database before distributing the database entry to the database server of the next lower-tier network device. The process then returns to Step 308.

Returning to Step 308, a determination is again made as to whether there is a database client higher in the VCP hierarchy. Once Step 308 is reached and a determination that there are no higher database clients in the VCP hierarchy, the last database client to receive the database entry is the root database client, and the process ends.

FIG. 4 shows a method for receiving a database entry at a database server of a leaf tier in accordance with one or more embodiments of the invention.

In Step 400, a copy of a database entry is received at a database server of a leaf network device from the database client of an intermediate network device. In one or more embodiments of the invention, the database entry includes VXLAN information such as a MAC-to-VTEP mapping. The database entry may have originated from any other database server of a leaf network device in the VCP hierarchy, and may have traveled through any previously described path through the VCP hierarchy to arrive at the intermediate device that transmits the database entry to the leaf tier database server.

In Step 402, the leaf network device examines the database entry to determine the MAC address present in the MAC-to-VTEP mapping included in the VXLAN information of the database entry. In one or more embodiments of the invention, the MAC address is a unique identifier of a computing device that may be extracted from the database entry.

In Step 404, the database of the leaf network device is checked to determine if it includes a locally learned database entry that includes VXLAN information in which the MAC address discovered in Step 402 is part of a MAC-to-VTEP mapping. In one or more embodiments of the invention, the leaf network device includes different databases for locally learned VXLAN information and remotely learned VXLAN information. In such embodiments of the invention, the received database entry is a remotely learned entry and any locally learned VXLAN information is stored in the database for local VXLAN information, which is checked to determine if it includes a database entry that includes the MAC address discovered in Step 402. If there is not, the process proceeds to Step 410. If there is a locally learned database entry, the process proceeds to Step 406.

Turing to Step 406, in Step 406, a determination is made as to whether the locally learned database entry discovered in Step 404 is newer than the received database entry. In one or more embodiments of the invention, each time a database entry is learned, it is given a local timestamp from the device that learned it. For example, a database server of a leaf network device locally learns VXLAN information and stores it in a local VXLAN information database along with a timestamp. Similarly, when a database sever receives VXLAN information as a database entry from a remote source, it receives a timestamp. In one or more embodiments of the invention, these timestamps are compared to determine which database entry is newer, with the older entry being discarded. In other embodiments of the invention, the database protocol provides for the propagation of timestamps as a part of propagated database entries and timestamps are added to database entries at the moment of creation and propagated with the database entries. In such embodiments, the database servers, database clients, and/or devices (e.g., network devices, computing devices, etc.) on which the database servers and/or clients execute are each included in a time synchronization domain in which they all adhere to a common time, which makes the time meaningful to each of the devices in the time synchronization domain. Having a common time may allow for meaningful comparison of timestamps created by different entities. In one or more embodiments of the invention, if the locally learned MAC-to-VTEP mapping is newer than the received (and thus remotely learned) MAC-to-VTEP mapping, the process proceeds to Step 408. If the locally learned MAC-to-VTEP mapping is older than the received MAC-to-VTEP mapping, then process proceeds to Step 410.

Turing to Step 408, in Step 408, after determining that a database entry received from a database client is older than a locally learned database entry, the leaf network device discards the received database entry and the process ends.

Turning to Step 410, in Step 410 the copy of the received database entry is stored in the database of the leaf network device and the older locally learned entry is discarded. After the database entry is stored and the locally learned database entry is discarded, the process ends.

Figure 5:
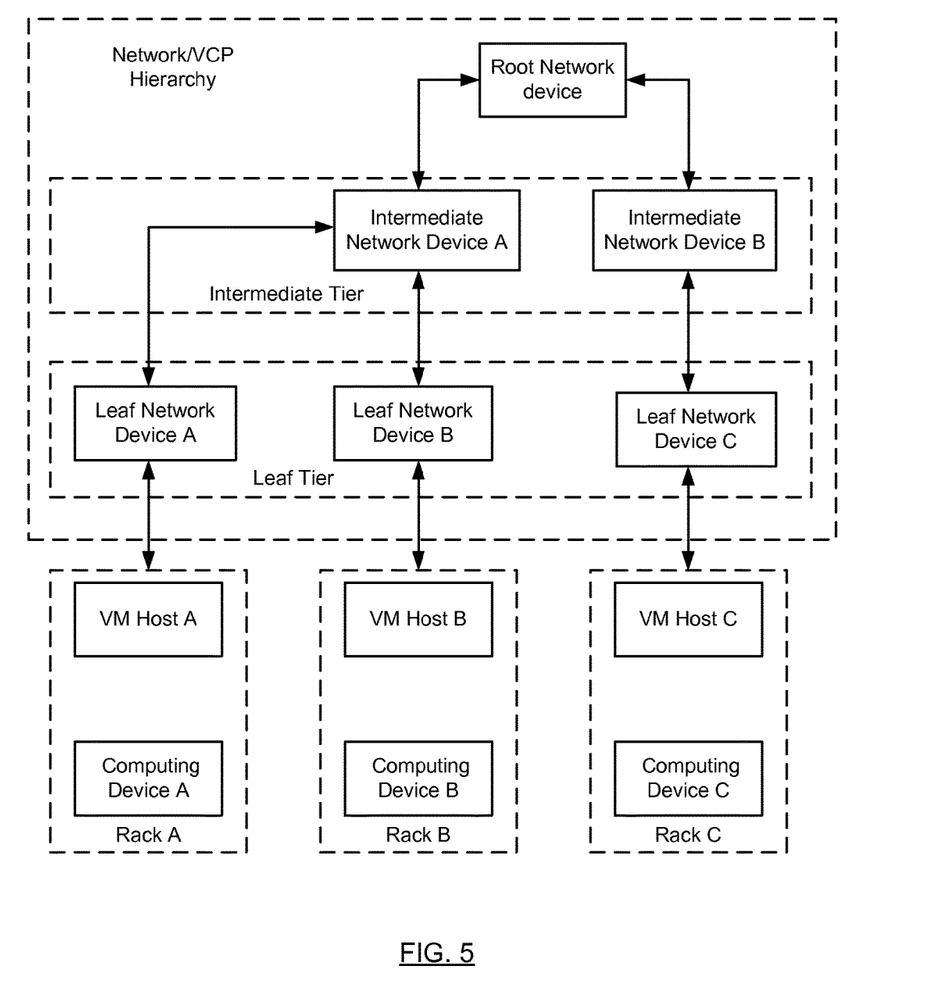
FIGS. 5 and 6 show examples in accordance with one or more embodiments of the invention.

FIG. 5 shows an example in accordance with one or more embodiments of the invention. The example is not intended to limit the scope of the invention.

Referring to FIG. 5, consider a scenario in which a VCP hierarchy of OVSDB servers and OVSDB clients exists within a network to which computing devices are operatively connected. The network/VCP hierarchy includes a root OVSDB client (not shown) executing on a root network device. The root network device is operatively connected to two intermediate network devices in an intermediate tier. Intermediate network device A includes a network virtualization controller, an OVSDB client, a database, and an OVSDB server and is operatively connected to leaf network device A and leaf network device B of the leaf tier. Intermediate network device B includes an OVSDB client, a database, an OVSDB server, and is operatively connected to leaf network device C of the leaf tier. A VTEP (not shown) and an OVSDB server are executing on each leaf network device, which also each include a database. Leaf network device A provides network connectivity to VM host A and computing device A of rack A. Leaf network device B provides network connectivity to VM host B and computing device B of rack B. Leaf network device C provides network connectivity to VM host C and computing device C of rack C. VM host A, VM host B, and VM host C are each configured to host a VM (not shown) and also each include an executing VTEP. Each VM has a virtual network interface card that includes a MAC address and is designated to participate in a VXLAN. Computing device B, computing device D, and computing device F are web servers that do not include a VTEP, have a network interface card that includes a MAC address, and are also designated to participate in a VXLAN.

In the above-described scenario, the VTEP executing on leaf network device A, in order to allow computing device A to participate in a VXLAN, generates VXLAN information A (not shown) that includes the MAC address of computing device A and the IP address of the VTEP of leaf network device A. This information is provided to the OVSDB server of leaf network device A, which stores VXLAN information A in the database of leaf network device A as database entry A (not shown).

Intermediate network device A, on which an OVSDB client is executing, is configured to query the database server of leaf network device A once per second for new database entries with new VXLAN information. Therefore, when the OVSDB client of intermediate network device A next queries the OVSDB server of leaf network device A, the OVSDB server responds by sending a copy of database entry A to the OVSDB client of intermediate device A. The OVSDB client of intermediate device A then distributes a copy of the database entry to an OVSDB server executing on leaf network device B. The OVSDB server executing on leaf network device B stores database entry A in the database of leaf network device B, which allows the VTEP executing on leaf network device B to determine the mapping between the MAC address of computing device A and the IP address of the VTEP executing on leaf network device A.

After the OVSDB client of intermediate network device A distributes database entry A to the OVSDB client executing on leaf network device B, the OVSDB client of intermediate network device A provides the database entry to the OVSDB server of intermediate network device A. The OVSDB server of intermediate network device A then stores database entry A in the database of intermediate network device A.

The root OVSDB client executing on the root network device is configured to query the OVSDB server executing on intermediate network device A once per second for new database entries that include new VXLAN information. Therefore, the next time the OVSDB client of the root network device queries the OVSDB server of intermediate network device A, the OVSDB server responds by sending a copy of database entry A to the OVSDB client of the root network device.

The OVSDB client of the root network device sits atop the VCP hierarchy, therefore it next distributes a copy of database entry A to the OVSDB server of intermediate network device B. The OVSDB server of intermediate network device B stores the copy of database entry A in the database of intermediate network device B. The OVSDB client of intermediate network device B then distributes a copy of the database entry to the OVSDB server of leaf network device C. The OVSDB server executing on leaf network device C stores the copy of database entry A in the database of leaf network device C, which allows the VTEP executing on leaf network device C to determine the mapping between the MAC address of computing device A and the IP address of the VTEP executing on leaf network device A.

Continuing the example, when a VM is created on VM host A that is designated to participate in a VXLAN, VXLAN information that includes the mapping between the MAC address of the VM and the IP address of the VTEP executing on VM host A is created by the VTEP of VM host A. The VTEP is configured to send the VXLAN information to leaf network device A. At this point, the VXLAN information is propagated through the VCP hierarchy in the same manner as described above in regards to the mapping between the MAC address of computing device A and the VTEP executing on leaf network device A.

The MAC-to-VTEP mapping for the VM on VM host B and the VM on VM host C, as well as the MAC-to-VTEP mapping for computing device B and computing device C may be propagated through the VCP fabric in the substantially the same manner as described above in regards to the mapping between the MAC address of computing device A and the VTEP executing on leaf network device A. Once the distribution of all MAC-to-VTEP mappings has occurred, the VTEP on each leaf network device may be aware of the MAC-to-VTEP mapping for each computing device and VM participating in the VXLAN without having to resort to multicast traffic or register with a single network virtualization controller to determine the MAC-to-VTEP mappings.

Figure 6:
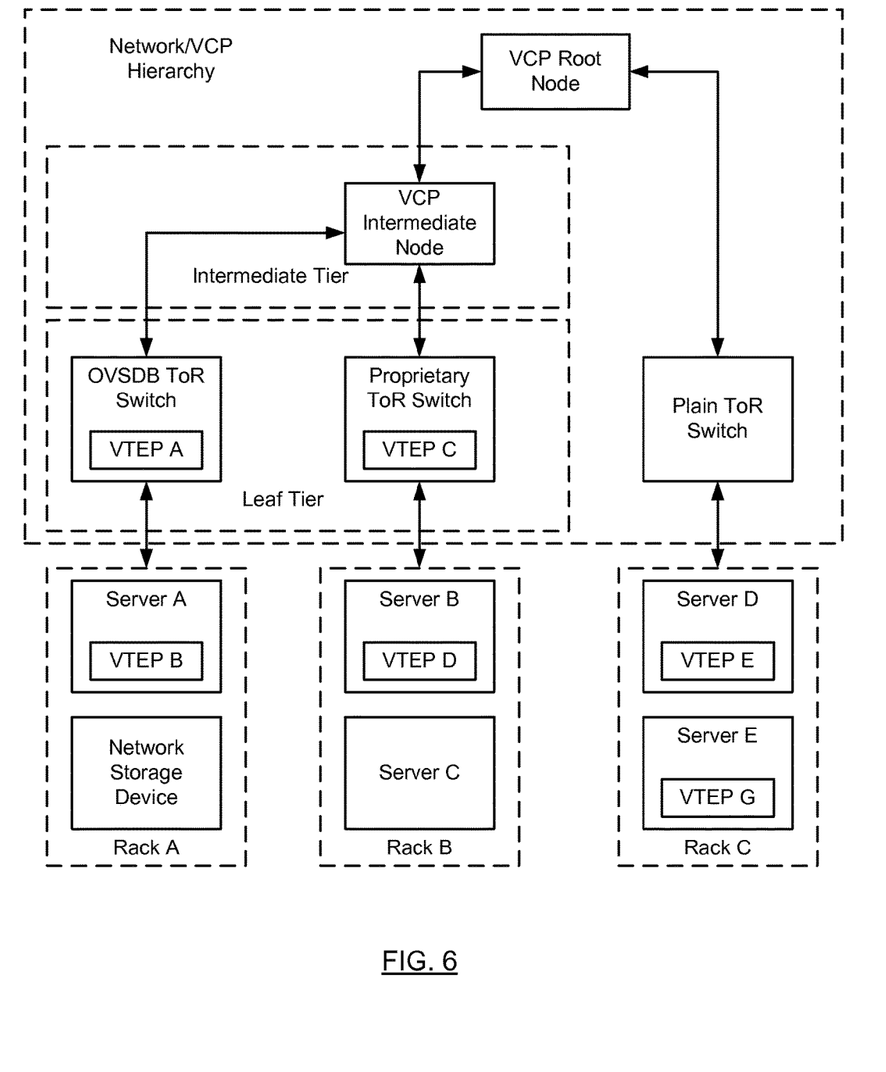

FIG. 6 shows an example in accordance with one or more embodiments of the invention. The example is not intended to limit the scope of the invention.

Referring to FIG. 6, consider a more complex scenario in which a VCP root node is a network virtualization controller executing in a VM that includes an OVSDB client. The VCP root node is operatively connected to a VCP intermediate node and to a plain Top of Rack (ToR) switch. The plain Tor switch is part of the network, but does not include functionality to participate in a VXLAN, meaning that it does not include a VTEP and is not capable of performing the functionality of the VXLAN protocol. The plain ToR switch provides network connectivity to server D and server E, both of which: are VM hosts, each host a VM, and each include a VTEP configured to allow the VM to participate in a VXLAN. Server D includes VTEP E, and server E includes VTEP G The VCP intermediate node is a multi-layer switch that includes a network virtualization controller, an OVSDB client, a database, and an OVSDB server and is operatively connected to an OVSDB ToR switch and a proprietary ToR switch of the leaf tier. The VCP intermediate node includes functionality to communicate VXLAN information with the OVSDB ToR switch using the OVSDB management protocol and with the proprietary ToR switch using a proprietary management protocol. A proprietary management protocol may be a management protocol designed to be used in conjunction with network devices from a single network device vendor.

The proprietary ToR switch is a multi-layer switch that includes VTEP C and provides network connectivity to server C, and to server B, which is a VM host that hosts a VM and that includes VTEP D. The proprietary ToR switch includes functionality to communicate VXLAN information using a proprietary management protocol.

The OVSDB ToR switch is a multi-layer switch that includes VTEP A, a database, and an OVSDB server. The OVSDB ToR provides network connectivity to a network storage device (e.g., network attached storage (NAS)) and to server A, which is a VM host that hosts a VM and that includes VTEP A. The OVSDB server of the OVSDB ToR switch includes functionality to communicate database entries that include VXLAN information using the OVSDB management protocol.

Each VTEP in this scenario includes a VTEP IP address. The VM on server A, the VM on server B, the VM on server D, and the VM on server E each include a virtual network interface with a MAC address. Both the network storage device of rack A and server C of rack B include a network interface with a MAC address.

Server C is designated to participate in a VXLAN, as is the VM executing on server B. VTEP D of server B obtains VXLAN information that includes the MAC address of the VM mapped to the IP address of VTEP D. This VXLAN information is shared with the proprietary ToR switch. In order to allow server C to participate in a VXLAN, the proprietary ToR also obtains VXLAN information that associates the MAC address of server C with the IP address of VTEP C.

The VCP intermediate node is configured to query the proprietary ToR switch, using the proprietary management protocol, for new VXLAN information once per second. Therefore, the next time the VCP intermediate node queries the proprietary ToR switch, the proprietary ToR switch shares with the VCP intermediate node, using the proprietary management protocol, a copy of the VXLAN information related to the VM on server B and the VXLAN information related to server C.

The VCP intermediate node creates one database entry for the VXLAN information related to the VM of server B and another database entry for the VXLAN information related to server C and, as an OVSDB client and using the OVSDB protocol, distributes copies of the two database entries to the OVSDB server of the OVSDB ToR switch. The OVSDB server of the OVSDB ToR switch stores copies of the two database entries in the database of the OVSDB ToR switch. At this point, VTEP A may use the two database entries to determine the mapping between the MAC address of the VM on server B and the IP address of the VTEP D, as well as the mapping between the MAC address of server C and the IP address of VTEP C.

The OVSDB client executing on the VCP root node is configured to query, using the OVSDB management protocol, the OVSDB server executing on VCP intermediate node once per second for new database entries that include new VXLAN information. Therefore, the next time the OVSDB client of the VCP root node device queries the OVSDB server of VCP intermediate node, the OVSDB server of the VCP intermediate device responds by sending copies of the two database entries to the OVSDB client of the VCP root node.

The network virtualization controller of the VCP root node is also configured to distribute VXLAN information to VTEP E of server D and VTEP G of server E. This allows VTEP E and VTEP G to determine the mapping between the MAC address of the VM on server B and the IP address of the VTEP D, as well as the mapping between the MAC address of server C and the IP address of VTEP C.

Continuing the example, the network storage device of rack A is designated to participate in a VXLAN, as is the VM executing on server A. VTEP B of server A obtains VXLAN information that includes the MAC address of the VM mapped to the IP address of VTEP B. This VXLAN information is shared with the OVSDB ToR switch. In order to allow server C to participate in a VXLAN, the OVSDB ToR also obtains VXLAN information that associates the MAC address of the network storage device of rack A with the IP address of VTEP A. The OVSDB ToR switch places the VXLAN information related to the VM of server A and the VXLAN information related to the network storage device of rack A as a separate database entries in the database of the OVSDB ToR switch.

The OVSDB client of the VCP intermediate node is configured to query the OVSDB sever of the OVSDB ToR switch, using the OVSDB management protocol, for new database entries that include VXLAN information once per second. Therefore, the next time the VCP intermediate node queries the OVSDB server of the OVSDB ToR switch, the OVSDB server of the OVSDB ToR switch sends copies of the two database entries, one that includes the VXLAN information related to the VM on server A and one that includes the VXLAN information related to the network storage device of rack A, to the OVSDB client of the VCP intermediate node.

The VCP intermediate node extracts the MAC-to-VTEP mapping related to the network storage device of rack A and the MAC-to-VTEP mapping related to the VM of server A and, using a proprietary protocol, distributes copies of the two mappings to the proprietary ToR switch. This allows VTEP C of the proprietary ToR switch to determine the mapping between the MAC address of the VM on server A and the IP address of the VTEP B, as well as the mapping between the MAC address of the network storage device of rack A and the IP address of VTEP A.

The VCP intermediate node is not include the highest-tier OVSDB client in the VCP hierarchy, therefore the VCP intermediate node stores the database entry that includes VXLAN information related to the VM on server A and the database entry that includes VXLAN information related to the network storage device of rack A in the database of the VCP intermediate node.

The OVSDB client of the VCP intermediate node also provides a copy of the database entries to the OVSDB server of the VCP intermediate node. The OVSDB server of the VCP intermediate node then stores the copies of the database entries in the database of the VCP intermediate node.

The OVSDB client executing on the VCP root node is configured to query, using the OVSDB management protocol, the OVSDB server executing on VCP intermediate node once per second for new database entries that include VXLAN information. Therefore, the next time the OVSDB client of the VCP root node device queries the OVSDB server of VCP intermediate node, the OVSDB server of the VCP intermediate device responds by sending copies of the two new database entries to the OVSDB client of the VCP root node.

The OVSDB client of the VCP root node sits atop the VCP hierarchy. The network virtualization controller of the VCP root node is configured to distribute VXLAN information to VTEP E of server D and VTEP G of server E. This allows VTEP E and VTEP G to determine the mapping between the MAC address of the VM on server A and the IP address of the VTEP B, as well as the mapping between the MAC address of the network storage device of rack A and the IP address of VTEP A.

Continuing the example, the VM of server D and the VM of server E are designated to participate in a VXLAN. VTEP E and VTEP G are configured to share VXLAN information with the VCP root node. Therefore, VTEP E sends to the VCP root node VXLAN information that includes the mapping between the MAC address of the VM of server D and the IP address of VTEP E. VTEP G sends the VCP root node VXLAN information that includes the mapping between the MAC address of the VM of server E and the IP address of VTEP G. The OVSDB client of the VCP root node then distributes, as database entries, the VXLAN information related to the VM of server D and the VXLAN information related to the VM of server E to the OVSDB server of the VCP intermediate node.

The OVSDB server of the VCP intermediate node stores, in the database of the VCP intermediate node, one database entry for the VXLAN information related to the VM of server D and another database entry for the VXLAN information related to the VM of server E. Next, the OVSDB client of the VCP intermediate node, using the OVSDB protocol, distributes copies of the two database entries to the OVSDB server of the OVSDB ToR switch. The OVSDB server of the OVSDB ToR switch stores the two database entries in the database of the OVSDB ToR switch. At this point, VTEP A may use the two database entries to determine the mapping between the MAC address of the VM on server D and the IP address of the VTEP E, as well as the mapping between the MAC address of the VM on server E and the IP address of the VTEP G.

The VCP intermediate node also extracts the MAC-to-VTEP mappings related to the VM of server D and the MAC-to-VTEP mapping related to the VM of server E and, using a proprietary protocol, distributes the two mappings to the proprietary ToR switch. This allows VTEP C of the proprietary ToR switch to determine the mapping between the MAC address of the VM on server D and the IP address of the VTEP E, as well as the MAC address of the VM on server E and the IP address of the VTEP G. At this point, VTEP A of the OVSDB ToR switch and VTEP C of the proprietary ToR switch each are aware of the MAC-to-VTEP mapping for the VM of server A, the VM of server B, the VM of server D, the VM of server E, the network storage device of rack A, and server C of rack B.

Although the examples presented in the descriptions of FIG. 5 and FIG. 6 use the OVSDB management protocol as the database management protocol, embodiments of the invention may use any database management protocol that exists now or that may be invented in the future, provided the database management protocol includes, at least, the necessary functionality to manipulate, move, and/or store database entries that include VXLAN information in accordance with one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for distributing virtual extensible local area network (VXLAN) configuration information in a multi-tier network, the method comprising:
   receiving first VXLAN configuration information, by an intermediate network device database client, executing on an intermediate network device in an intermediate tier of the multi-tier network, from a first leaf network device database server executing on a first leaf network device,
      wherein the first VXLAN configuration information is generated by a virtual tunnel endpoint (VTEP) that is operatively connected to the first leaf network device, and
      wherein the first VXLAN configuration information comprises a VTEP Internet Protocol (IP) address to Media Access Control (MAC) address mapping;
   comparing a first timestamp associated with the first VXLAN configuration information with second timestamp of a first database entry to make a determination that the VXLAN configuration information is newer than the first database entry;
   discarding the first database entry based on the determination;
   storing, after discarding the first database entry, the first VXLAN configuration information in a second database entry in an intermediate network device database on the intermediate network device;
   sending a first copy of the second database entry, by the intermediate network device database client, to a root network device; and
   sending a second copy of the second database entry, by the intermediate network device database client, to a second leaf network device database server that is executing on a second leaf network device.

2. The method of claim 1, further comprising:
   receiving at the intermediate network device database client, using a first management protocol, second VXLAN configuration information;
   storing, by the intermediate network device, the second VXLAN configuration information in a third database entry in the intermediate network device database; and sending, using a second management protocol, a copy of the third database entry to the first leaf network device.

3. The method of claim 2, further comprising:
sending, using the second management protocol, the second database entry from an intermediate network device database server of the intermediate network device to the root network device.

4. The method of claim 2, wherein the second management protocol is an Open vSwitch Database (OVSDB) management protocol.

5. The method of claim 1, wherein the root network device comprises a root database client.

6. The method of claim 1, wherein the root network device comprises a network virtualization controller.

7. The method of claim 1, wherein the root network device is a switch.

8. The method of claim 1, wherein the VTEP IP address is associated with the VTEP and wherein the VTEP is executing on a computing device operatively connected to the first leaf network device.

9. The method of claim 1, wherein the VTEP IP address to MAC address mapping comprises a MAC address of a first computing device and an IP address of the VTEP executing on the first leaf network device, wherein the first computing device is operatively connected to the first leaf network device.

10. The method of claim 1, wherein the VTEP IP address to MAC address mapping comprises a MAC address of a virtual machine executing on the first computing device and an IP address of the VTEP executing on the first computing device, wherein the first computing device is operatively connected to the first leaf network device.

11. The method of claim 1, wherein the first VXLAN configuration information comprises a first MAC address and wherein the method further comprises, before comparing the first timestamp with the second timestamp:
inspecting, by the first leaf network device database server, the first VXLAN configuration information to determine the first MAC address of the first VXLAN configuration information; and
inspecting the intermediate network device database to determine that the intermediate network device database comprises the second database entry comprising the first MAC address, wherein the second database entry comprises second VXLAN configuration information and wherein the second VXLAN configuration information is locally-learned VXLAN configuration information.

12. A system comprising:
a first leaf network device comprising a first virtual extensible local area network (VXLAN) tunnel endpoint (VTEP) and operatively connected to a first computing device;
a second leaf network device comprising a second leaf network device database server and a second VTEP;
an intermediate network device in an intermediate tier of a multi-tier network, the intermediate network device operatively connected to the first leaf network device and to the second leaf network device, wherein the intermediate network device comprises an intermediate network device database client, an intermediate network device database server, and an intermediate network device database, and wherein the intermediate network device is configured to:
receive, from the first leaf network device, first VXLAN configuration information associated with the first computing device, wherein the first VXLAN configuration information comprises a VTEP Internet Protocol (IP) address to Media Access Control (MAC) address mapping;
compare a first timestamp associated with the first VXLAN configuration information with a second timestamp of a first database entry to make a determination that the VXLAN configuration information is newer than the first database entry;
discard the first database entry based on the determination;
store the first VXLAN configuration information in a second database entry in the intermediate network device database;
send, by the intermediate network device database server, a first copy of the second database entry to a root network device; and
send, by the intermediate network device database client, a second copy of the second database entry to the second leaf network device database server.

13. The system of claim 12, wherein the intermediate network device is one selected from a group consisting of a switch, a router, and a multi-layer switch.

14. The system of claim 12, wherein the root network device comprises a root network device database client, wherein the first VXLAN configuration information is received by the intermediate network device from the first leaf network device using a first management protocol, and wherein the first copy of the first database entry is sent to the root network device database client by the intermediate network device database server using a second management protocol.

15. The system of claim 14, wherein the root network device is a network virtualization controller.

16. The system of claim 14, wherein the second management protocol 1s an Open vSwitch Database (OVSDB) management protocol.

17. The system of claim 12, wherein the intermediate network device is further configured to:
receive at the intermediate network device database client and using a first management protocol, a second database entry;
extract second VXLAN configuration information from the second database entry; and
send, using a second management protocol, the second VXLAN configuration information to a third leaf network device, wherein the third leaf network device is operatively connected to the intermediate network device.

* * * * *

UNITED STATES PATENT AND TRADEMARK OFFICE
CERTIFICATE OF CORRECTION

PATENT NO. : 10,216,853 B2  
APPLICATION NO. : 14/317713  
DATED : February 26, 2019  
INVENTOR(S) : Kenneth James Duda

Page 1 of 1

It is certified that error appears in the above-identified patent and that said Letters Patent is hereby corrected as shown below:

In the Claims

Column 20, Line 44, in Claim 16, the word "1s" should read -- is --.

Signed and Sealed this
Twenty-sixth Day of November, 2019

Andrei Iancu
*Director of the United States Patent and Trademark Office*